(12) United States Patent
Chapman (10) Patent No.: US 8,240,748 B2
(45) Date of Patent: Aug. 14, 2012

(54) MODULAR VEHICLE AND TRIANGULAR TRUSS SUPPORT SYSTEM THEREFOR

(75) Inventor: Nicholas J. Chapman, Chico, CA (US)

(73) Assignee: Draco Trust, Stateline, NV (US)

( * ) Notice: Subject to any disclaimer, the term of this patent is extended or adjusted under 35 U.S.C. 154(b) by 294 days.

(21) Appl. No.: 12/604,367

(22) Filed: Oct. 22, 2009

(65) Prior Publication Data

US 2010/0102596 A1   Apr. 29, 2010

Related U.S. Application Data (60) Provisional application No. 61/197,410, filed on Oct. 28, 2008, provisional application No. 61/209,350, filed on Mar. 6, 2009, provisional application No. 61/177,608, filed on May 12, 2009.

(51) Int. Cl.
*B62D 21/08* (2006.01)
*B62D 33/077* (2006.01)

(52) U.S. Cl. ......... 296/193.04; 296/187.07; 296/187.08; 296/205

(58) Field of Classification Search ............ 296/193.04, 296/203.01–203.04, 205, 187.07, 187.08, 296/193.07; 89/36.08
See application file for complete search history.

(56) References Cited

U.S. PATENT DOCUMENTS

| | | | | |
|---|---|---|---|---|
| 4,422,685 A | * | 12/1983 | Bonfilio et al. | .......... 296/193.04 |
| 4,600,069 A | * | 7/1986 | Oswald et al. | ............ 180/24.02 |
| 4,660,345 A | * | 4/1987 | Browning | .................... 52/653.2 |
| 4,676,545 A | * | 6/1987 | Bonfilio et al. | .......... 296/193.04 |
| 4,737,055 A | | 4/1988 | Scully | |
| 4,842,326 A | * | 6/1989 | DiVito | ..................... 296/193.04 |
| 4,950,026 A | * | 8/1990 | Emmons | .................. 296/203.01 |
| 5,156,230 A | * | 10/1992 | Washburn | ..................... 180/170 |
| 5,301,997 A | * | 4/1994 | Cudden | ...................... 296/182.1 |
| 5,401,056 A | * | 3/1995 | Eastman | ....................... 280/785 |
| 5,573,300 A | * | 11/1996 | Simmons | ................. 296/193.04 |
| 5,660,428 A | * | 8/1997 | Catlin | ........................ 296/205 |

(Continued)

FOREIGN PATENT DOCUMENTS

DE    102 33 274    2/2004

(Continued)

OTHER PUBLICATIONS

Lance 825 short bed camper, http://www.lancecamper.com/truck-campers/825/, dry weight 1,730 pounds, 2011.*

(Continued)

*Primary Examiner* — Glenn Dayoan
*Assistant Examiner* — Gregory Blankenship
(74) *Attorney, Agent, or Firm* — Bayer Law Group LLP (57) ABSTRACT

A modular vehicle includes a base body having a frame, driver compartment, chassis, motor and wheels, a removable modular component adapted to be locked and unlocked therefrom, and locks that fasten the removable modular component within the base body. The removable modular component provides added structural rigidity to the frame when installed, and can comprise at least 20 percent of the overall volume and at least 20 percent of the overall weight of the entire vehicle. Locks permit the modular component to be removed and replaced with another removable modular component when said locks are unlocked. Various modular components can be directed toward medical, weapons, fire equipment, rescue equipment, hunting supplies, reconnaissance, command center, outback vehicle, or a survival camper. A triangular truss support system provides increased support and protection for the underside of the vehicle, such as for when the vehicle runs over an IED or other destructive device.

20 Claims, 10 Drawing Sheets

U.S. PATENT DOCUMENTS

| | | | | |
|---|---|---|---|---|
| 5,882,064 A * | 3/1999 | Emmons | | 296/193.04 |
| 5,954,364 A * | 9/1999 | Nechushtan | | 280/781 |
| 6,302,010 B1 * | 10/2001 | Holler | | 296/187.07 |
| 6,782,623 B1 * | 8/2004 | Gerzeny et al. | | 29/897.2 |
| 7,441,809 B1 * | 10/2008 | Coombs et al. | | 280/785 |
| 7,726,675 B2 * | 6/2010 | Ben-Ari et al. | | 280/149.2 |
| 7,922,238 B2 * | 4/2011 | Ische | | 296/193.04 |
| 7,984,941 B2 * | 7/2011 | Lorenzo et al. | | 296/35.3 |
| 2008/0017426 A1 * | 1/2008 | Walters et al. | | 180/65.2 |
| 2008/0284118 A1 * | 11/2008 | Venton-Walters et al. | | 280/6.154 |
| 2010/0102596 A1 * | 4/2010 | Chapman | | 296/193.03 |

FOREIGN PATENT DOCUMENTS

| | | |
|---|---|---|
| EP | 0 490 366 | 6/1992 |
| EP | 1 291 607 | 3/2003 |

OTHER PUBLICATIONS

Lance 855/855S, http://www.lancecamper.com/truck-campers/855/, dry weights 2,420 pounds/2,620 pounds, 2011.*
Lance 850, http://www.lancecamper.com/truck-campers/850/, dry weight 2,350 pounds, 2011.*
Lance 1050/1050S, http://www.lancecamper.com/truck-campers/1050/, dry weights 2,790 pounds/2,980 pounds, 2011.*
Partial Search Report dated Jan. 13, 2010 from International Application No. PCT/US2009/061747.
Search Report dated May 3, 2010 from International Application No. PCT/US2009/061747.
Written Opinion dated May 3, 2010 from International Application No. PCT/US2009/061747.
Australian Search Report dated Sep. 26, 2011 from Australian Application No. 2009320179.

* cited by examiner

MODULAR VEHICLE AND TRIANGULAR TRUSS SUPPORT SYSTEM THEREFOR

CROSS-REFERENCE TO RELATED APPLICATIONS

This patent application claims priority to each of U.S. Provisional Patent Application No. 61/197,410, filed Oct. 28, 2008, and entitled "Multi-Use Modular Vehicle;" U.S. Provisional Patent Application No. 61/209,350, filed Mar. 6, 2009, and entitled "Structural Modular POD Support;" and U.S. Provisional Patent Application No. 61/177,608, filed May 12, 2009, and entitled "Modular Vehicle And Triangular Truss Support System Therefor," all of which are incorporated by reference herein in their entirety and for all purposes.

TECHNICAL FIELD

The present invention relates generally to motorized vehicles, and more particularly to the design and creation of versatile and off-road capable motorized vehicles and internal support structures thereof.

BACKGROUND

Motorized ground vehicles have served humanity well for over a century. As such vehicles have developed and evolved over that time, many different advances and improvements have resulted in greater speeds, increased safety, better creature comforts for users and varying aesthetic appearances. The advent of automotive factories and mass manufacturing of motorcycles, cars, trucks and other motorized ground vehicles have brought these many advances to consumers, governments, militaries, transportation industries, professional racers and other interested parties. While various advances have progressed at a significant clip over the past century, there still remain some obstacles and drawbacks within this field of endeavor.

One drawback to virtually all motorized vehicles is the limited application that any one specific vehicle might have. For example, a consumer automobile is primarily used to transport a small number of people from one place to another, an 18-wheel rig and trailer is primarily used to transport cargo and goods over significant distances, an ambulance is primarily used to transport one or two injured persons to the nearest medical care facility, and a military tank is primarily used to provide support and fight in military battles. Numerous other vehicles and primary uses exist and are generally well known. The primary uses for these different vehicles are specific in nature, and each of these different vehicles is not well suited or even unable to provide the primary use or function of one of these other vehicles.

Most specific vehicles, such as the car, rig, ambulance and tank in the above examples, are not expected to carry out a wide nature of different uses. As such, most vehicles are made to do one or two specific things and are generally inflexible as to being able to perform other significantly different functions efficiently. Thus, where an entrepreneur may require the functions of a delivery truck, a passenger car and a forklift, for example, three separate vehicles are typically procured. Further needs, such as the ability to transport materials off-road or an armored car, such as for bank or military use, then typically result in the procurement of even more vehicles.

While many designs and applications of motorized vehicles have generally worked well in the past, there is always a desire to provide new and improved designs or techniques that result in the more versatile use of such vehicles. In particular, what is desired are motorized vehicles that are adaptable to a wider variety of applications without requiring the acquisition of further vehicles for such differing uses.

SUMMARY

It is an advantage of the present invention to provide increased modularity for motorized vehicles. This can be accomplished at least in part through the use of a motorized vehicle having a base unit and a removable interchangeable module that locks into the base unit. Another advantage of the present invention is the ability to provide increased support and protection along the underside of a motorized vehicle. This can be accomplished at least in part through the use of a triangular truss system and accompanying armor or plating situated along the vehicle frame bottom.

In various embodiments of the present invention, a modular vehicle can include a base body having a frame and cavity region, a removable modular component and one or more locking mechanisms that fasten the removable modular component within the cavity region of the base body. The base body unit can also have a driver or passenger compartment, a chassis and a motor adapted to propel the vehicle. A plurality of wheels can be coupled to the base body, driven by the motor and adapted to facilitate the movement of the vehicle over ground. The removable modular component is preferably adapted to be locked and unlocked from the base body unit, and can provide added structural rigidity to the frame when installed within the base body unit. In various embodiments, the removable modular component can come in varying sizes, and can be at least 20 percent of the overall volume and at least 20 percent of the overall weight of the entire modular vehicle. Alternatively, the removable modular component can be about half of the overall volume and about half of the overall weight of the entire modular vehicle. When unlocked, the one or more locking mechanisms can permit the removable modular component to be removed and replaced with another different removable modular component.

In various embodiments, the nature of the removable modular component substantially defines the general overall function of the modular vehicle when the removable modular component is installed therein. In addition, the nature of the other removable modular component can substantially define the general overall function of the modular vehicle when that other removable modular component is installed therein, with the nature of the other modular component being substantially different than the nature of the original removable modular component. The other removable modular component can be selected from a variety of other components, such as up to six or more different removable modular components. In some embodiments, the nature of a removable modular component can be, for example, military, drug running, medivac, firefighting, biochemical threat control, search and rescue, hunting, reconnaissance, command center, outback vehicle, survival camper, strike vehicle, border patrol, personnel transport and crowd control, among others.

In various embodiments, the locking mechanisms can include a central locking unit located at the center of a floor at said cavity region of the base body. Further locking mechanisms can be distributed at locations along each edge where the removable modular component meets the base body, such as at three locations along each edge. In some embodiments, the modular vehicle can be a ground based vehicle having three or more wheels. Although four wheels are thought to work well, alternative configurations with three or five or more wheels are also contemplated. The modular vehicle can also include a vehicular support system or triangular truss system, such as those set forth below.

In various further embodiments of the present invention, a vehicular support system can include a primary tube arrangement, a plurality of secondary tubes, one or more diaphragms and one or more bulkhead fittings. The primary tubes can be arranged in parallel into a triangular pattern, wherein said plurality of primary tubes is adapted to run along at least one dimension of an associated vehicle, such as lengthwise along an underside of the vehicle. The plurality of secondary tubes can be arranged in triangular patterns between the primary tubes such that each of the secondary tubes is coupled to two of the primary tubes, and is arranged at an angle with respect to each of the coupled primary tubes. Such an angle can be, for example, about 45 degrees, although other angles may also be suitable. The primary and secondary tubes can be formed from a variety of materials, such as a metallic alloy or polymer, and may also be filled with one or more materials.

In some embodiments, one or more diaphragms can be coupled to the arrangement of primary tubes, and are preferably adapted to deflect upward and outward in response to an explosive or other concentrated outside force incumbent thereupon. In addition, one or more bulkhead fittings located can be located at one or more distal ends of the primary tubes. Each of these bulkhead fittings can be adapted to couple the vehicular support system to a vehicle frame or chassis, and can also be adapted to absorb stress in response to such an explosive or other concentrated outside force, with potential failure of the bulkhead fitting facilitating further protection to the passengers and/or contents inside the vehicle.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and arrangements for the disclosed inventive modular motorized vehicles and support structures therefor. These drawings in no way limit any changes in form and detail that may be made to the invention by one skilled in the art without departing from the spirit and scope of the invention.

DETAILED DESCRIPTION

Exemplary applications of apparatuses and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting; such that other embodiments may be used, and changes may be made without departing from the spirit and scope of the invention.

The invention relates in various embodiments to a modular vehicle. In particular, such a modular vehicle can include a primary or base body unit having a frame, chassis and motor, as well as a removable modular component adapted to lock into place within the base unit. The invention also relates in various embodiments to the various locking mechanisms and schemes that can be used to lock and unlock a removable modular component in place to a respective modular vehicle. The invention also relates in various embodiments to a triangular truss type support structure for a vehicle, such as the modular motorized vehicle disclosed herein. Each of these modular vehicle, locking mechanism and vehicular support system aspects will be discussed in turn herein. Although the present disclosure refers primarily to ground-based vehicles having wheels, such as a "humvee" type of vehicle, it is to be understood that the various inventive elements disclosed herein can also be applied to a wide variety of other vehicle types, such as boats, submarines, planes, rockets or any other vehicle, as may be appropriate.

Modular Vehicle

Figure 1:
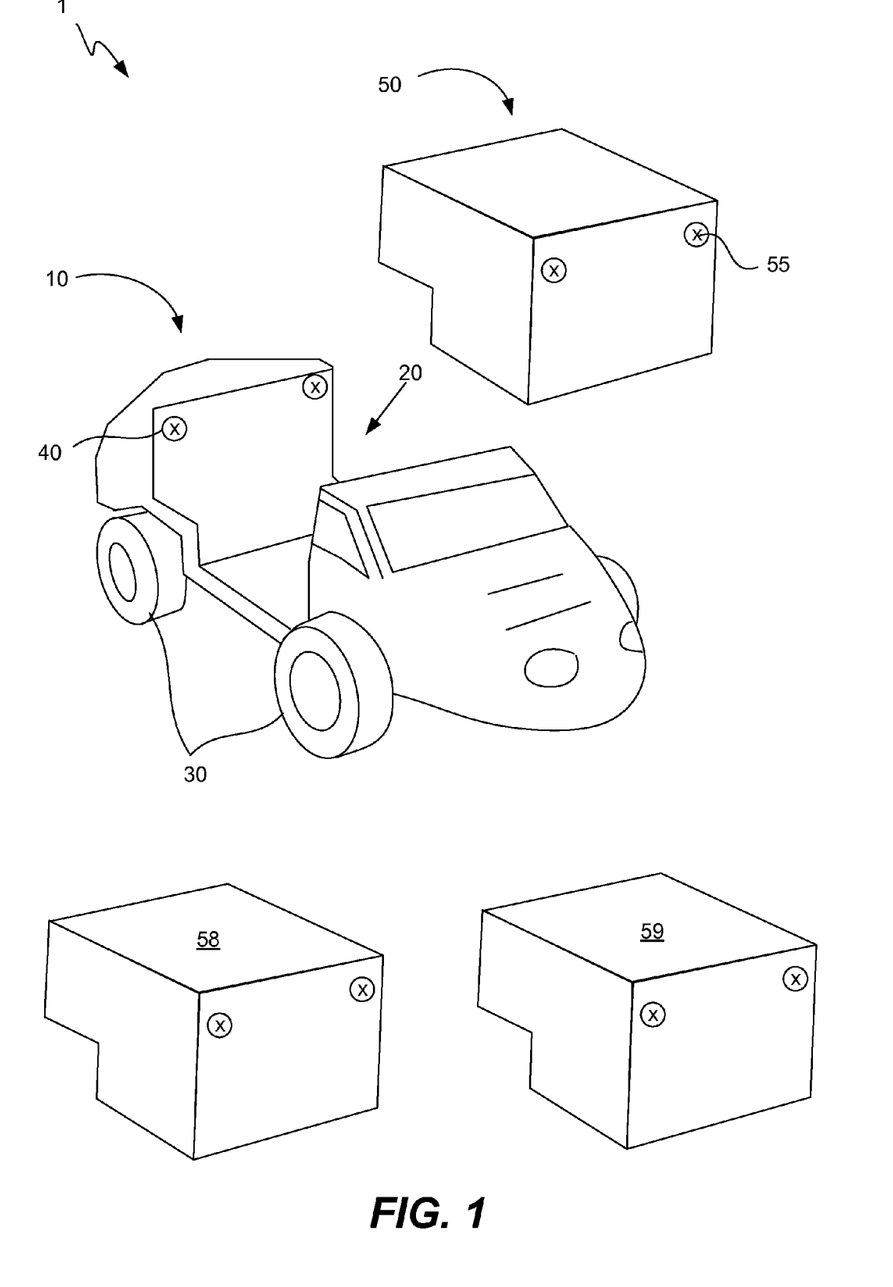
FIG. 1 illustrates in block diagram format an exemplary modular vehicle and a plurality of removable modular components therefor according to one embodiment of the present invention.

Turning first to FIG. 1, an exemplary modular vehicle and a plurality of removable modular components therefor are illustrated in block diagram format according to one embodiment of the present invention. Modular vehicle system 1 includes a base body unit 10 and a removable modular component 50 that is adapted to be installed, locked, unlocked and removable from the base body unit. Base body unit 10 can include a cavity region 20 that is adapted to accommodate removable modular component 50 therein, as well as a plurality of wheels 30 and one or more locking mechanisms 40 that are used to lock and unlock the removable modular component. One or more mating locking mechanisms 55 can also be placed in corresponding locations on removable modular component 50. As shown in FIG. 1, a total of four pairs of mating locking mechanisms exit at each of the upper corners between base body unit 10 and removable modular unit 50. It will be readily appreciated that fewer or more locking mechanisms may be used, as may be desired.

Further, the primary locking device or item for any given pair of mating locking mechanisms 40, 55 can exist entirely on the base body unit 10, on the removable modular component 50, or a combination of both. Although the actual primary locking device or item may be located on one of base body 10 or removable component 50, the corresponding bar, hole, wall or other passive item on the mating part of the corresponding body or component shall also be referred to as a locking mechanism for purposes of convenience. It will be readily understood that any of a number of suitable locking mechanisms can be used, and a variety of examples are provided in greater detail below.

As shown, a wide space or cavity region 20 toward the center and upper half of the base body unit 10 is set to accommodate a removable module 50. Although the location is toward the center and from the top of the base body unit 10 in the illustrated example, it will be readily appreciated that other locations for such a space or cavity my also be used. Such a space 20 and removable module 50 therefor can take up the volume of, for example, two standard sized pallets (e.g., 40×48×48 inches each, or larger), although it will be readily appreciated that wide variances in the actual size, volume and weight for such modules may be used. Various applications and details with respect to such a removable module component are provided in greater detail below.

One feature of modular vehicle system 1 is that base body unit 10 can be adapted to accommodate a wide variety of removable modular components. For example, not only is removable modular component 50 suitable for installing into base body unit 10, but alternative removable modular components 58 and 59 are as well. Each of removable modular components or modules 50, 58, 59 are thus not only removable, but also interchangeable with base body unit 10. Although not shown, it will also be understood that a plurality of different base body units 10 can each also accommodate any of removable modular components 50, 58, 59. Of particular interest is that each of the different removable modules 50, 58, 59 can be substantially different in nature, such that the overall function or nature of a combined vehicle having a modular component installed within base body unit 10 changes depending upon which module is installed.

Modular vehicle system 1 is particularly suitable for on or off-road applications, such that the vehicle could be deployed as a military, drug running, medivac, firefighting, biochemical threat control, search and rescue, hunting, reconnaissance, command center, outback vehicle, survival camper, strike vehicle, border patrol, personnel transport, fuel or fluid tanker and/or crowd control vehicle, among other uses, depending upon the particular removable modular component installed therein. Thus, the modular vehicle 1 utilizes a base concept that includes a "unitable" construction and an explosion proof or resistant underbelly while remaining lightweight and extremely agile, thus allowing the unit to travel at very high speeds with or without a driver. The modular vehicle 1 can utilize suspension components that are uniquely suited for GPS navigational input in order to control the agile nature and potential for landing and take-off performance, where applicable.

Figure 2:
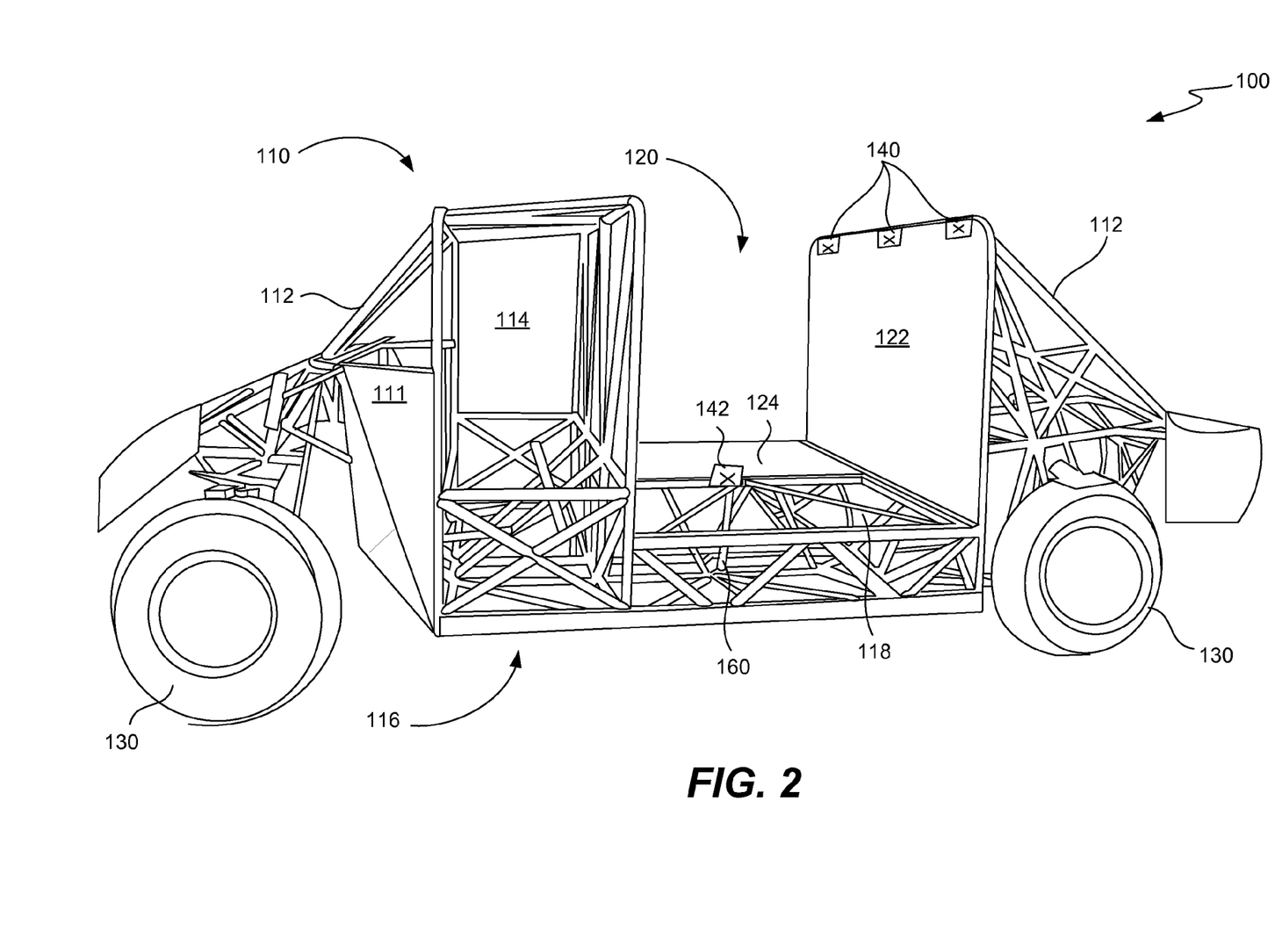
FIG. 2 illustrates in side perspective view a skeletal structure of an exemplary modular vehicle having a removable modular component removed therefrom according to one embodiment of the present invention.

Moving now to FIG. 2 a skeletal structure of an exemplary modular vehicle having a removable modular component removed therefrom is illustrated in side perspective view according to one embodiment of the present invention. Modular vehicle 100 includes a base body unit 110, a plurality of wheels 130, a plurality of locking mechanisms 140, 142, a triangular truss system 160, and may also include a removable modular component (not shown). Cavity region 120 can be located within base body unit 110 for installation of a removable modular component, and can include a back wall 122 and one or more floor panels 124. As shown, a second floor panel has been removed for purposes of illustration. Base body unit 110 can include a frame 112 that can be made up of a plurality of bars, tubes and/or other structural devices, a driver compartment 114 formed within the frame, a chassis 116 also made from a plurality of bars, tubes and/or other structural devices, and a motor 118, among other possible items. One or more outer panels 111, doors, fenders and/or the like may cover various outer portions of modular vehicle and provide an exterior thereto, although most outer panels and similar components have not been shown for purposes of illustration. These and any such additional items can be added as may be desired.

A front driver and/or passenger compartment 114 can provide space for one to three persons, such as, for example, a center driver and two passengers at the sides. Due to space premiums, a jumpseat type arrangement may be preferable in such a modular vehicle. Alternatively, a sophisticated drone vehicle may be used, such that no driver or passengers are required. Such a "personnel compartment" may then be smaller and/or filled with storage, equipment, fuel and/or other items. In the event of larger vehicles or a desire to permit greater personnel transport, driver and passenger compartment 114 can be made larger as needed. An onboard computer (not shown) may also be located within or about the driver compartment 114.

Figure 3A:
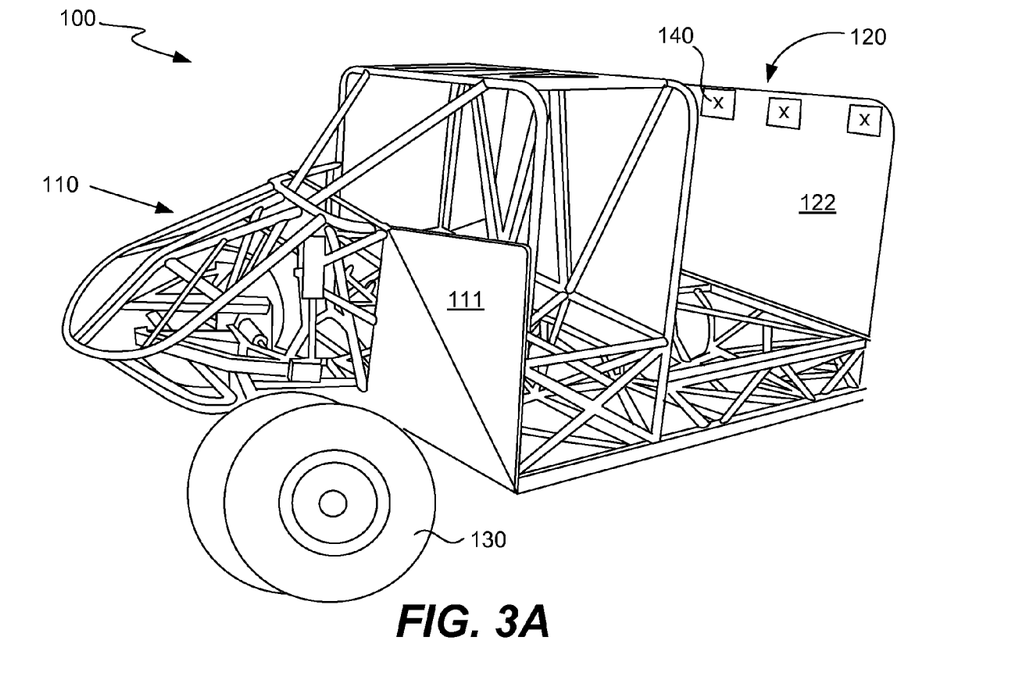
FIG. 3A illustrates in front corner perspective view the modular vehicle of FIG. 2 according to one embodiment of the present invention.
Figure 3B:
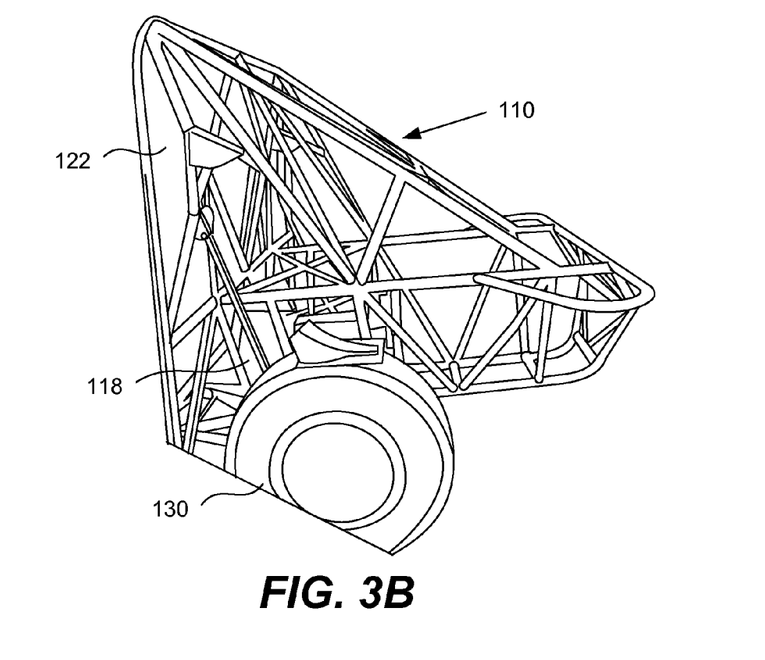
FIG. 3B illustrates in rear corner perspective view the modular vehicle of FIG. 2 according to one embodiment of the present invention.

FIGS. 3A and 3B illustrate in front corner perspective and rear corner perspective views respectively the modular vehicle of FIG. 2 according to one embodiment of the present invention. These figures provide additional perspective with respect to the front and back of modular vehicle 100. Motor 118 can be located underneath and to the rear of the vehicle, although other locations are also possible. Also, motor 118 can be included within or outside of triangular truss system 160, as may be desired. Triangular truss system can run beneath the vehicle and between bulkheads that exist at motor 118 at one end and at the driver compartment 114 at the other end. Modular vehicle 100 can also include independent suspensions for each wheel, an automatic transmission/differential combination and various other suitable vehicular items, as will be readily appreciated. Although a wide variety of sizes and shapes may be used, this particular illustrative example is of a modular vehicle that is about seven feet wide by about sixteen feet long by about seven feet high.

Although four wheels 130 are illustrated, it will be readily appreciated that three wheels, or five or more wheels might also be used instead. In the event of three wheels, one front wheel for steering and two back wheels for drive might be used, for example. Other configurations and numbers of wheels may also be used. Although any wheel size is certainly possible, each of four wheels 130 can be about 39 inches in diameter or larger, and each wheel assembly may have its own sophisticated suspension system, such that extreme off-road conditions may be traversed with speed and ease. Of course, alternative wheel sizes and arrangements may be employed as desired. For example, three or five wheels may be used for such a modular vehicle. Furthermore, wheels may be 50 inches in diameter, or more.

Figure 4A:
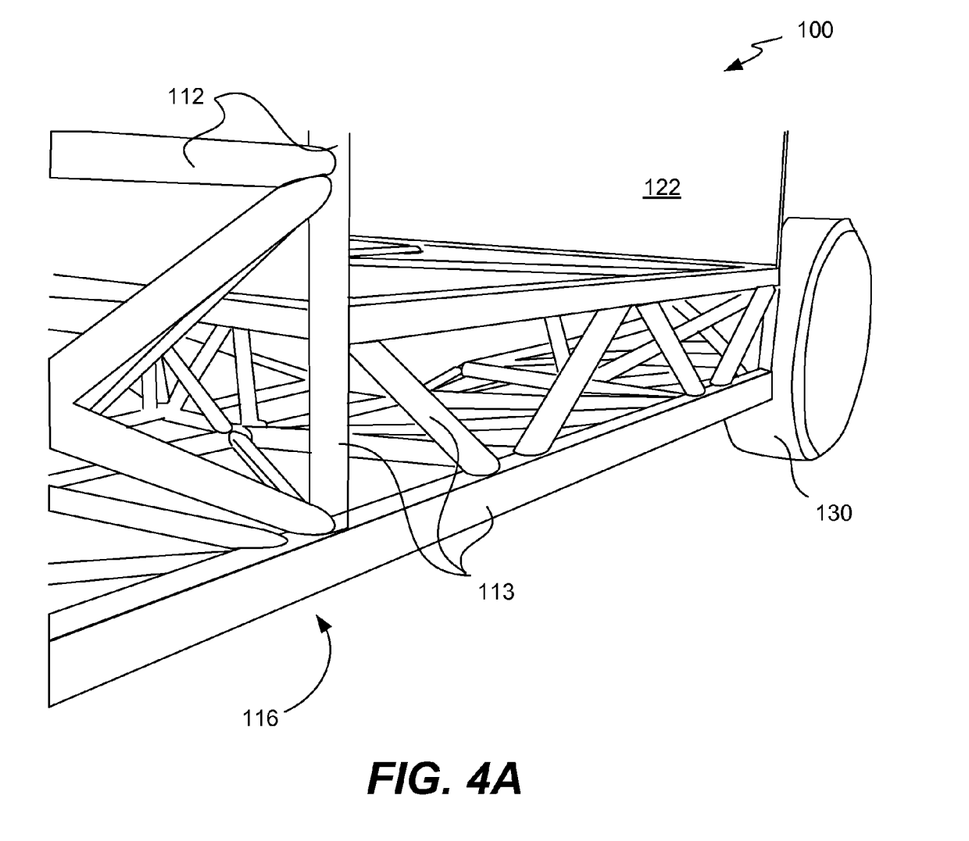
FIG. 4A illustrates in front corner elevated view a representative portion of the frame and chassis of the modular vehicle of FIG. 2 according to one embodiment of the present invention.

Continuing now with FIG. 4A, a representative portion of the frame and chassis of the modular vehicle of FIG. 2 is illustrated in front corner elevated view. Again, modular vehicle 100 includes, among other items, a plurality of wheels 130, a back panel 122 of a cavity region for a removable modular component, and a bottom chassis 116 and an outer frame 112, both of which can be comprised of a number of structural members such as bars, rods or tubes 113. With respect to the base body unit 110 itself, a framework comprising a plurality of tubes provides substantial support and rigidity for the overall vehicle 100, such that a wide variety of aggressive off-road and/or military uses are possible, including border patrol, firefighting, reconnaissance, rescue and other specialty uses. In various embodiments, the framework tubing 113 can be metallic, such as iron or steel. In particular, the alloy Chromalloy is thought to be particularly suitable for use in this application, due to its favorable lightweight yet strong properties. Tubing dimensions can vary dramatically depending upon placement about the vehicle and strength and load displacement needs. Further, tubes 113 may taper in wall thickness, overall diameter, cross-sectional area, filler material and/or shape, as may be needed.

Figure 4B:
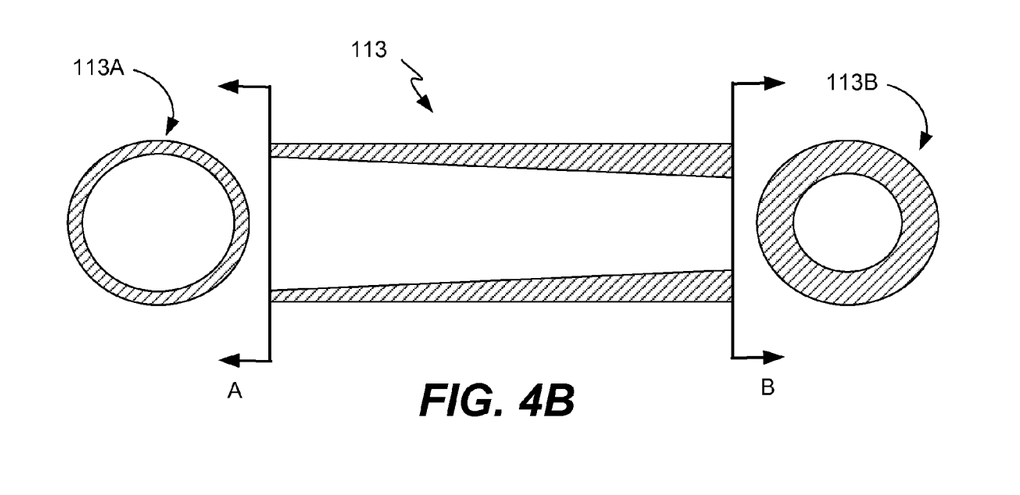
FIG. 4B illustrates in front, side and rear cross-sectional views a representative portion of a tube from the frame or chassis of the modular vehicle of FIG. 2 according to one embodiment of the present invention.

FIG. 4B illustrates in front, side and rear cross-sectional views a representative portion of a tube from the frame or chassis of the modular vehicle of FIG. 2 according to one embodiment of the present invention. Structural tube 113 can have a tapered cross-section, for example, such that the tube walls are narrower at end 113A than at end 113B. Tubes 113 may also be filled or partially filled with Kevlar, glass-filled propylene, metals or other alloys or composites thereof. For example, several framing tubes can have a wall thickness of about 0.120 inches, and a diameter that ranges from about 0.50 to 3.0 inches. Tubes are also not limited to being circular in nature, and may have various cross-sectional shapes, such as triangular, square, trapezoidal, oval, and the like.

Figure 5A:
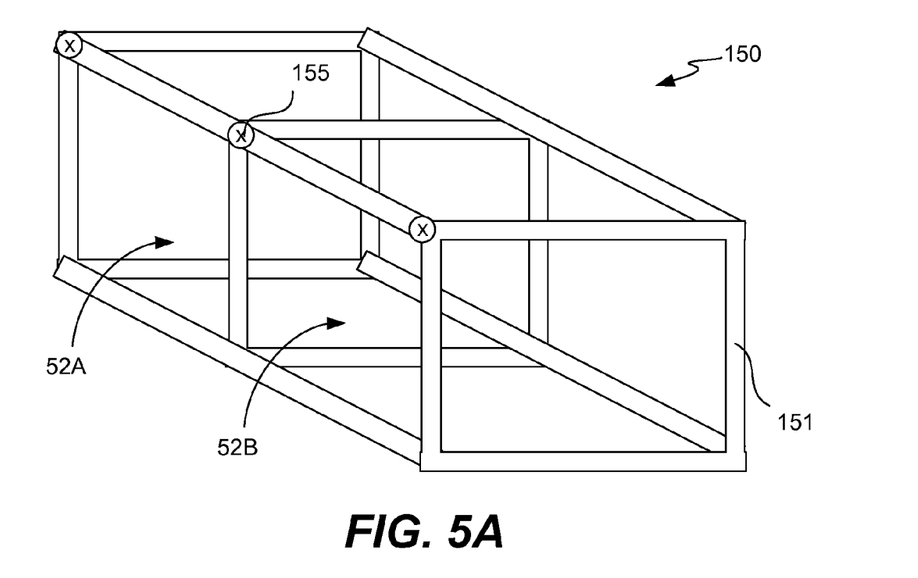
FIG. 5A illustrates in front perspective view a skeletal structure of an exemplary removable modular component according to one embodiment of the present invention.

Turning next to FIG. 5A, a skeletal structure of an exemplary removable modular component according to one embodiment of the present invention is shown in front perspective view. Removable modular component 150 can have a plurality of standardized dimensions, such that a wide variety of different and interchangeable removable modular components can be designed for known base body units, such as those described above. A plurality of bars or tubes 151 can form an outer support skeleton or structure for removable modular component 150 such that two regions or compartments 52A, 52B within the modular component are formed. A wall may be formed between these two different regions, or the space for both may be combined such that a single large compartment is formed, as may be desired. Again, the total volume of removable modular component 150 can be standardized, and can be, for example, the size of two standard sized pallets (e.g., 40×48×48 inches each). Alternative dimensions are also possible, as may be desired. A plurality of locking mechanisms 155 can be located on an outer edge or surface of removable modular component 150 as well, such that the component can be locked into a base body.

Figure 5B:
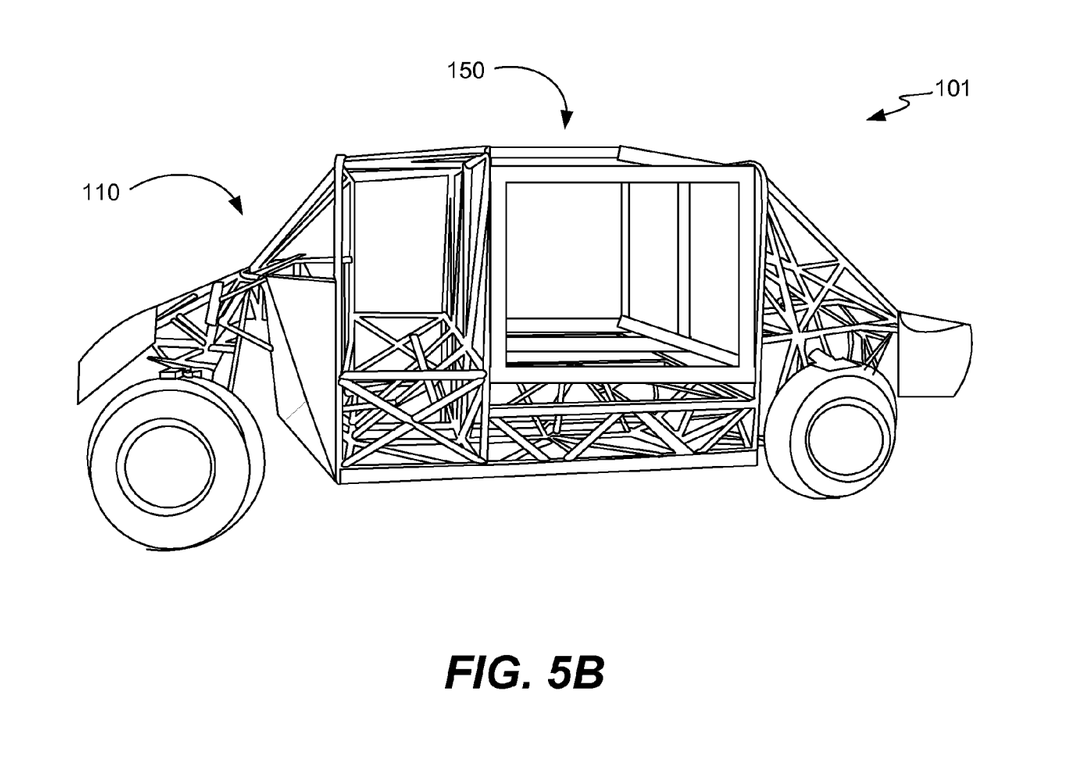
FIG. 5B illustrates in side perspective view the modular vehicle of FIG. 2 having the removable modular component of FIG. 5A installed therein according to one embodiment of the present invention.

FIG. 5B illustrates in side perspective view the modular vehicle of FIG. 2 having the removable modular component of FIG. 5A installed therein according to one embodiment of the present invention. As shown, modular vehicle 101 includes a base body unit 110 having a removable modular component 150 installed therein, such that a completed vehicle having a distinctive overall nature or functionality that is dependent upon the nature of the removable modular component. It will be understood that removable modular component 150 can be removed and replaced with another different modular component, making a new configured vehicle, yet utilizing the same power plant distribution and such on the base configuration. This can allow versatility in any type of environment, whether sub-freezing, high desert, high altitude or sub-water uses.

Although a wide variety of removable and interchangeable modules can be used, approximately six specific different varieties are provided here for purposes of illustration. It will be readily appreciated that there are many uses beyond these specific examples, and that any suitable module may be designed so long as appropriate dimensions and locking characteristics are observed to interface with one or more suitable body base units. Variations on the removable modular component can include, but are not limited to, for example:

- Medical Module (MM) with stealth ability and/or driverless features;
- Attack Module (AM) that has missile launchers, gun turrets, and the like;
- Troop Deployment Module (TDM) which can carry up to 7 troops comfortably with equipment. It can move in and out of a theater extremely fast and/or can be placed by air deployment;
- Insulated Canopy Module (ICM) designed for low temperature applications while running in up to −60 degree temperatures, with various creature comforts;
- Search and Rescue Module/Border Patrol Module (SEM), can be configured to site specific applications; and
- Specialized Modular sensitive design configurations, as required.

Additional types of removable modular components can include, for example, military, drug running, medivac, firefighting, biochemical threat control, search and rescue, hunting, reconnaissance, command center, outback vehicle, survival camper, strike vehicle, border patrol, personnel transport and crowd control, among others. In various embodiments, modular vehicle 101 can deploy rapidly in various configurations while being lightweight, agile, and very dependable—similar to an F18 on wheels. Of course, other applications beyond military or off-road applications are also possible, and it is specifically contemplated that all such modular uses are encompassed within the present invention.

One significant feature to modular vehicle 100 is the ability to remove the removable modular component 150 and replace with another modular component, with various modular components radically changing the actual or potential uses of the modular vehicle. For such vehicles applications to be so dramatically changed, it is generally important that the removable and interchangeable module be significant in size. For example, such a removable module can comprise about half of the overall weight and volume of the entire vehicle, with the base body unit comprising the other half of the overall vehicle weight and volume. In order for such a wide variety of applications and uses to be possible, it is thought that the interchangeable and removable modules comprise at least 20 percent of the weight and at least 20 percent of the volume of the vehicle. Of course, other arrangements and percentages are also possible, such as where the base body unit is substantially larger or reconfigured.

Of particular note is the fact that the removable modular component 150 provides substantial support and rigidity to the structure of the overall vehicle 101 when it is installed. As can be seen from the provided illustrations, the insertion of a removable module 150 having its own fortified framework into the space 120 provided therefore results in increased stability and resistance to axial and torsional forces in the framework 112 of the base body unit 110. In general, rigidity is defined as the ability to retrain the frame components from buckling or twisting beyond acceptable limits.

Such adverse effects are also avoided through the construction of strong frameworks 112, 151 for both the base body unit 110 and the removable modular component 150. This can be accomplished through the use of heat treatment, special alloys and the utilization of carbon composites, and other polymers, among other suitable possibilities, to produce a frame to support each of the base and removable structures from collapsing, and to enable the base unit 110 to carry a removable module 150 that self-locks and self loads. Various components can be heat treated, as an example, and other ways of producing said overall spring-type arrangements such that the unit does not crack or break, but flexes without losing integrity. As can be seen, the installed module itself distributes loads along its beams, tying the entire unit together and the upper portion, not just the lower portion of said frame.

Again, when loaded and locked into the base vehicle body unit, the removable modular component 150 or "Modular Pod" helps distribute stresses across the entire vehicle frame 112, including compression, tension and torsional stresses, and minimizes the oscillation cause by harmonics and vibrations across the vehicle. This is done by way of distributing the load of the removable modular component 150 to the rest of the base body unit frame 112. In addition, the base body unit 110 can run minus the removable modular component 150 with minimal stress, because it distributes most of these stresses to triangular truss system 160. This further support is provided with respect to a triangular truss composite that runs along the length of said base frame unit, as noted below.

Again, the design of the illustrated modular vehicle is preferably universal and standardized, such that service of the unit can be performed anywhere in the world under various standards and with its enhanced abilities, can allow it to be remotely operated, as well as operating on any type of fuel systems around the world, including for example, a hydrogen concept power plant, using steam and various other components for driving, including electrical operation and battery packs that can be modulated also. Removable modular components 150 can preferably be swapped out for different alternative modules in less than one hour such that the overall vehicle 101 can be ready for a completely different mission or use. The use of cranes, lifts, jacks and the like may be used to facilitate such module swapping. In some embodiments, removable modular components may be light enough for manual interchanging of modular components, although assistive machinery and devices are thought to be useful in this regard.

Locking Mechanisms

Referring back to FIG. 2, various locking mechanisms 140, 142 can be seen with respect to cavity region 120. Again, such locking mechanisms 140, 142 on the base body unit 110 can mate with one or more locking mechanisms on the removable modular component, such that the removable modular component is locked in place within cavity 120. A wide variety of suitable configurations for and types of locking mechanisms 140, 142 can be used, as will be readily appreciated. In the illustrated example, three edge locking mechanisms 140 are distributed across the top of back wall 122, which edge locking mechanisms can be structurally supported by a top tube or bar running behind the back wall. Three more similar edge locking mechanisms (not shown) may also be located along the top of the opposing front wall to cavity region 120. If desired, additional edge locking mechanisms may also be distributed along the bottom edge or edges of the cavity walls where the removable modular component meets the frame of base body unit 110. One or more floor locking mechanisms 142 may also be available, such as on one or more floor panels 124 within cavity region 120.

FIGS. 6A-6I illustrate in various side cross-sectional, plan and perspective views a variety of exemplary locking mechanisms for the modular vehicle of FIG. 2 according to various embodiments of the present invention. In general, one or more locking mechanisms or devices can keep the removable modular component in place within the base body unit once it is installed. Although one central locking unit 142 at the center of the base unit floor 124 may suffice in some instances, it is thought that a plurality of locking mechanisms can be placed at strategic locations along the base body unit vehicle frame. Such locks can be placed at, for example, three distributed locations along each edge where the modular component meets the vehicle base unit. For purposes of illustration, framing of the base body unit 112 has been designated as circular and framing of the removable modular component 151 has been designated as rectangular in the following examples. It will be readily appreciated that other shapes or cross-sectional aspects for each of these items may be used, however.

Figure 6A:
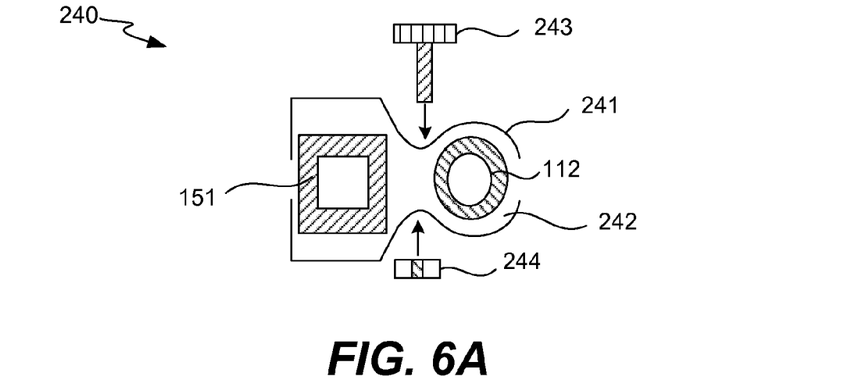
FIGS. 6A-6I illustrate in various side cross-sectional, plan and perspective views a variety of exemplary locking mechanisms for the modular vehicle of FIG. 2 according to various embodiments of the present invention.

FIG. 6A depicts in side cross-sectional view a standard stud clamp 240. In such an arrangement, two pieces 241, 242 clamp together, such as by a bolt 243 and nut 244, and hold the entire unit together by distributing load within the square 151 to round tubing 112, thus absorbing and transferring stress through the removable modular component.

Figure 6B:
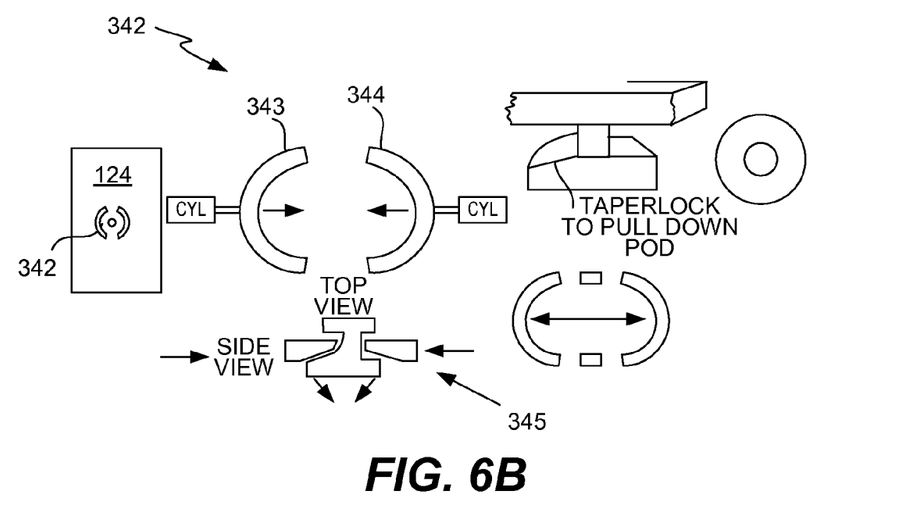

FIG. 6B depicts in various views a bottom pin locking mechanism 342, wherein two cylinders 343, 344 pivot together with a C type clamp system 345 that is tapered. Such a mechanism can be located at the bottom center of the removable modular mechanism, for example.

Figure 6C:
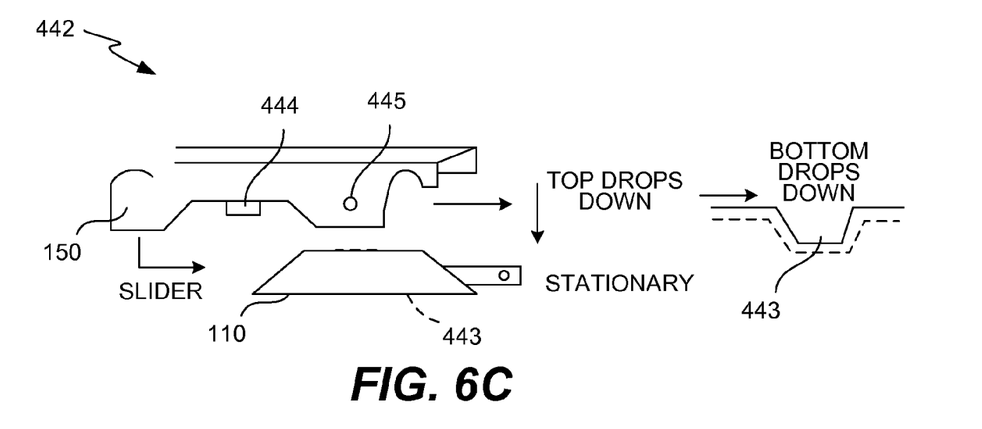

FIG. 6C depicts in side plan view a locking mechanism 442 wherein the removable modular component 150 slides into the base body unit 110 such that its bottom drops into one or more pockets 443. Such a dropping action can also involve the use of a taper 444, as shown, with draw pins 445 hydraulically activated to lock the entire unit in place.

Figure 6D:
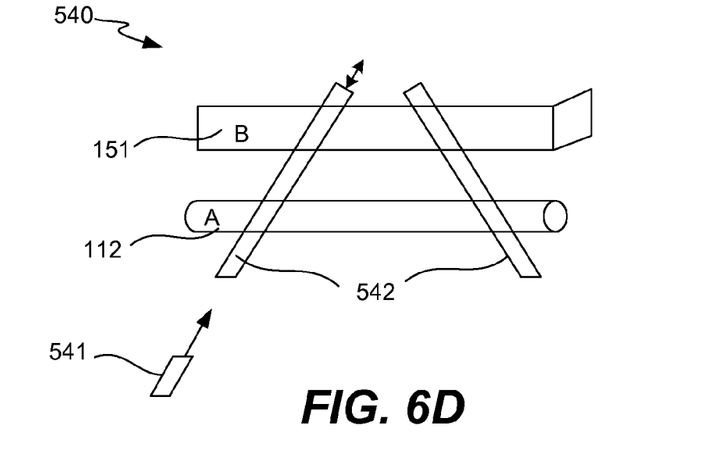

FIG. 6D depicts in top view a locking mechanism 540 having a series of pins 541 and sleeves 542 that can be arranged such that square and round tubes of the modular component 151 and base body unit 112 are sleeved, with a taper pin 541 then sliding through from each side. The angle of modular component 151 against base body unit 112 can be different by about 5 to 10 degrees, such that a jam fit based on hydraulic pressure can be applied, thus locking the unit in place.

Figure 6E:
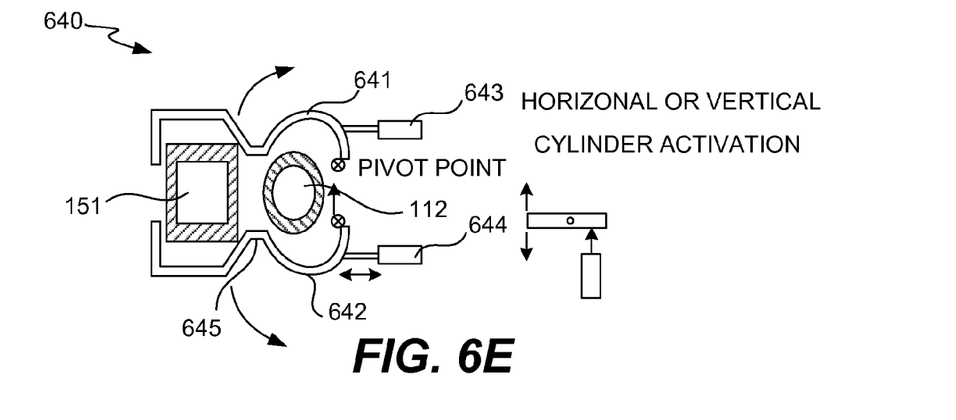

FIG. 6E depicts in side cross-sectional view a locking mechanism 640 including a rotating clamp 641, 642 that is hydraulically actuated through arms and levers 643, 644 such that it clamps down and results in a triangular center piece 645 being wedged between the square and round tubes 151, 112. Materials for such an arrangement can include, for example, graphite, glass filled propylene or nylon. The mechanism can also be tapered, such that a sliding effect could accompany the clamping effect upon actuation.

Figure 6F:
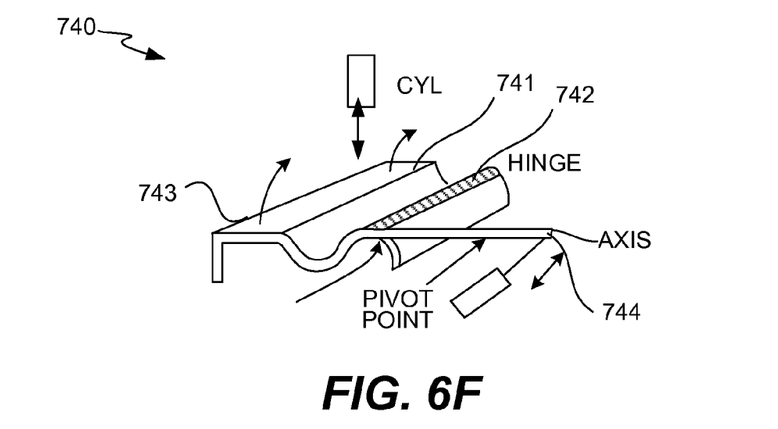

FIG. 6F depicts in side cross-sectional view a locking mechanism 740 that involves a hinged unit 741 that is welded into place onto a round tube, such as base body unit frame tubing. The hinge 742 would allow the square tube cap 743 to fold back out of the way, and the hinge could be actuated mechanically, manually or hydraulically using arm actuators 744, for example.

Figure 6G:
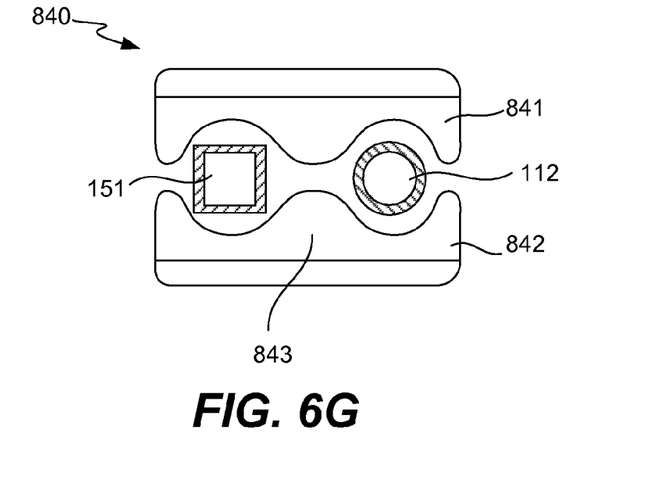

FIG. 6G depicts in side cross-sectional view a locking mechanism 840 that involves the use of air or liquid bladders 841, 842 that rotate into place or lower into position by way of hydraulic actuators. The air or liquid bladders 841, 842 can have a V-shape 843 in the center so that they surround the tube entirely and through the middle as they are lowered, thus distributing stress and locking it in. This particular locking mechanism 840 could be particularly effective for side edge locks when used in combination with locking mechanism 342 for floor locks above.

Figure 6H:
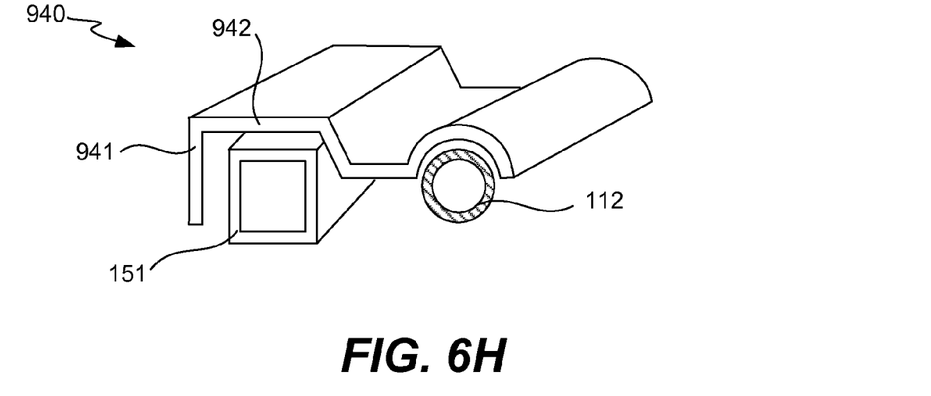

FIG. 6H depicts in side cross-sectional view a locking mechanism 940 that includes a welded and clamped type device 941 that could be used with various hold downs, such as those shown in locking mechanism 342 as well. This device 941 can be welded at one or more particular locations 942 onto a rectangular frame tube 151 of a removable modular component, for example. As the removable modular component is then slid into the base body unit, device 941 will slide along the round tube 112 and falls into place as it self locks or clamps itself.

Figure 6I:
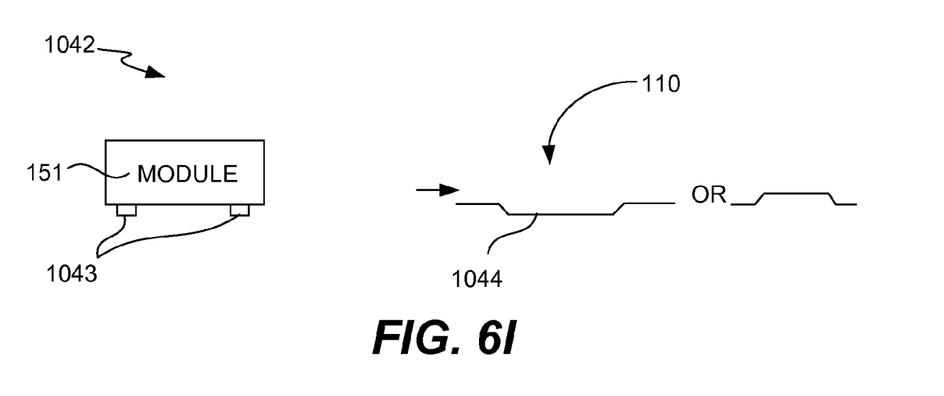

FIG. 6H depicts in side plan view a locking mechanism 1042 where the removable modular component 150 can have feet or bottom extensions 1043 that fall into place into holes or abscesses 1044 in the base body unit 110 when it is installed, thus providing further locking support for the removable modular component. This final arrangement is preferably used in combination with one or more of the foregoing locking arrangements for side edge locking mechanisms. In fact, it is specifically contemplated that two or more of the foregoing locking arrangements may all be used in combination, such that increased security and integrity of the removable module component with respect to the base body unit can be realized.

Vehicular Support System

In addition to support from the removable modular component, modular vehicle can receive further support from a vehicular support system. Such a vehicular support system can be, for example, a triangular truss system that takes advantage of the strengths and load transfers inherent to a triangular type design. It will be readily appreciated though that the vehicular support system disclosed herein does not necessarily have to be in a particular triangular shape, and alternatively can be rectangular, round, and/or have other geometries in order to produce the ultimate different affects for different types of applications, as may be desired.

The use of a triangular truss running lengthwise along the underside of the vehicle, for example, allows a V-Hull type design base to take an extreme explosion or other sudden force from underneath the vehicle, one of many examples for military use, and collapses one or more diaphragms in which each of the truss members then collapse accordingly. The various truss members and diaphragms are deigned to absorb such an explosive load by deflection and crushing, producing safety to the occupants or contents inside the vehicle. This concept redistributes the load to other portions of said frame, and when in combination of the lightness of the entire unit, provides increased safety and protection to all occupants and contents. In addition, special blow-out features allow any fuel carried within these chambers of this low area to be blown out the back, further protecting said occupants.

In particular, the truss system can comprise a series of main or primary tubes arranged in a triangular pattern. For example, three primary tubes arranged horizontally along the underside of the vehicle frame can be used. Within this primary triangular truss arrangement can be a series of shorter secondary tubes patterned into "V" shapes, such as at 45 degree angles with respect to the elongated primary tubes. Different angles and relative arrangements can alternatively be used, such as to optimize force and stress distributions in the event of an IED explosion or other cataclysmic event or concentrated outside force. For example, "S" shaped tubes rather than straight tubes may be used, such that deflection of various tubes and diaphragm components can be maximized. In addition, pipe thickness and/or materials of composition may be continuous or may be tapered where advantageous with respect to deflection away from passengers and valuable cargo.

Figure 7A:
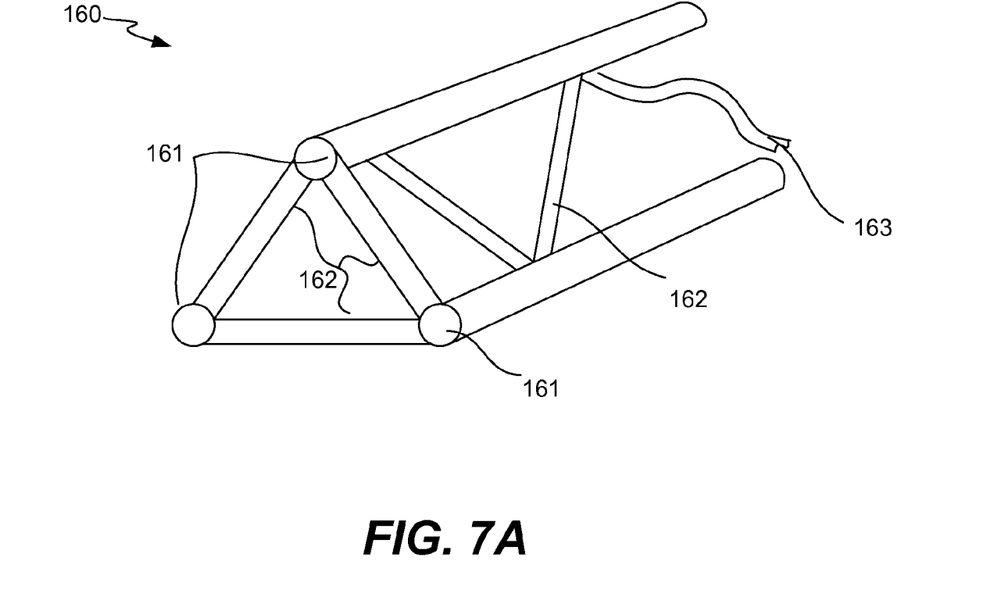
FIG. 7A illustrates in block diagram format an exemplary triangular truss for a vehicle according to one embodiment of the present invention.

Referring now to FIG. 7A, an exemplary triangular truss for a vehicle according to one embodiment of the present invention is shown in block diagram format. Triangular truss 160 can be used for the various modular vehicles 100, 101 set forth herein, for example, and can be configured to run lengthwise along a bottom portion of the vehicle such that added structural support is provided. In addition, triangular truss 160 can be used in a variety of other vehicular applications, and not necessarily only with vehicles having removable modular components such as those provided herein. Triangular truss 160 can have a plurality of primary tubes 161 and also a plurality of secondary tubes 162, 163 that couple to the primary tubes. Although the primary and secondary structural members are tubes as shown herein, it will be readily appreciated that bars, rods or other types of structural members may also be used for a triangular truss, as may be suitable.

Primary tubes 161 can be arranged into a triangular formation such that all of the primary tubes are substantially parallel and run along a particular dimension of the associated vehicle. As shown, exactly three primary tubes can be used, such that a single elongated triangular structure is formed. Alternatively, additional primary tubes (not shown) can be used, such that a plurality of elongated triangular structures can be formed. Such additional triangular structures can be placed side by side or even made as a part of each other (e.g., sharing a side), for greater structural rigidity.

A plurality of secondary tubes 162, 163 can be welded or otherwise coupled at various locations along each of primary tubes 161 such that the primary tubes are connected and spaced apart a set distance. Secondary tubes 162 can be straight in nature and traverse directly from one primary tube 161 to another primary tube, with the ends of each secondary tube being welded or otherwise affixed at a respective primary tube. Alternative secondary tubes 163 can be "S" shaped in nature, such that additional sudden outside forces or stresses can be absorbed or deflected via added deformations in these S shaped secondary tubes. One or both types of secondary tubes 162, 163 can be used to connect the various primary tubes 161 to each other, as may be desired. As will be readily appreciated, a general outside force or stress 199 directed toward one edge of triangular truss 160 will be directed along the various primary tubes 162 and secondary tubes 163 in a favorable manner, due to the triangular configuration of structural components.

Figure 7B:
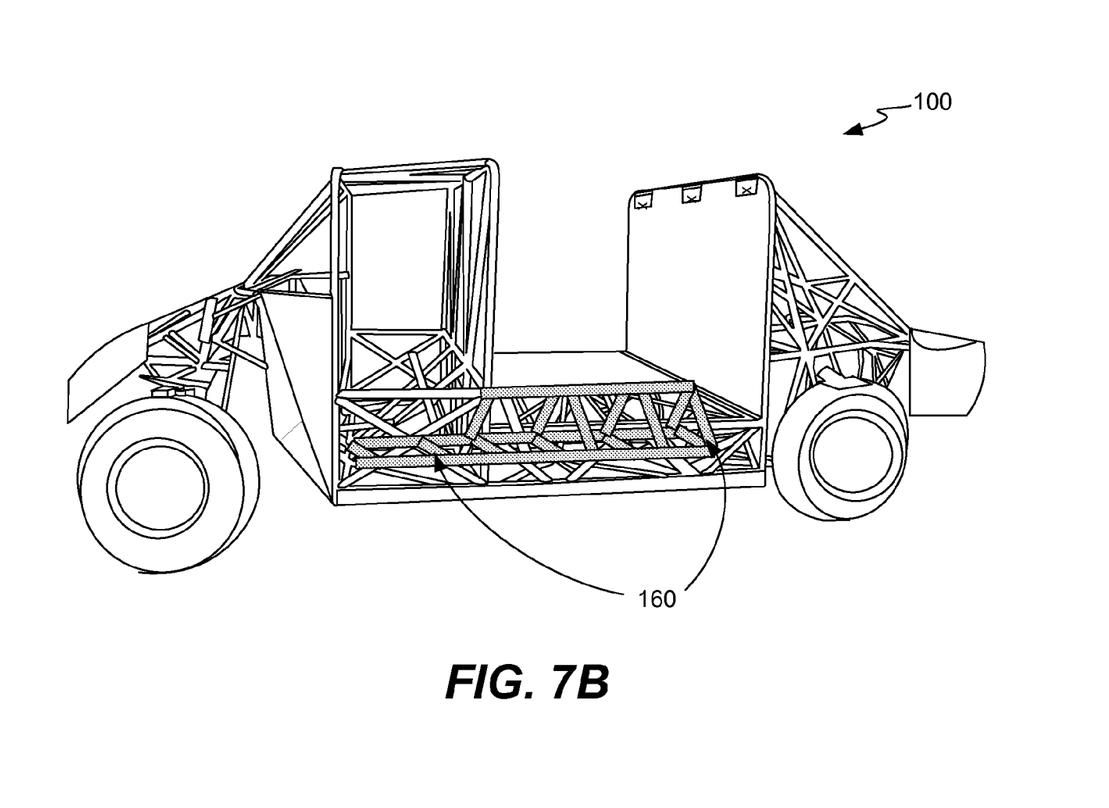
FIG. 7B illustrates in side elevation view the modular vehicle of FIG. 2 having the internal triangular truss system highlighted according to one embodiment of the present invention.

FIG. 7B illustrates in side elevation view the modular vehicle of FIG. 2 having the internal triangular truss system highlighted according to one embodiment of the present invention. As shown, modular vehicle 100 is identical or substantially similar to the modular vehicle of earlier examples. The extent of triangular truss 160 has been highlighted, however, as this truss is not highly visible in earlier examples. Triangular truss 160 can run lengthwise along modular vehicle 100, and can stop at the location of the motor or continue through and surround or house the motor at the back end. At the front end, triangular truss can extend to or through the driver compartment, and can even extend up to the front wheel axle, as may be desired.

The overall triangular truss system 160 can be, for example, twelve feet in length, and can have bulkheads at one or both ends. Specialized bulkhead fittings can be used to absorb stresses and/or direct them away from passengers and vehicle contents. In addition, such bulkhead fittings may be designed to break or fail in a specific manner, so as to further direct damages away from passengers and cargo. In some embodiments, one or more bulkheads may connect trusses arranged in series, such that different truss sections may be allowed to fail and/or redirect forces and stresses based on their positioning with respect to the entire vehicle.

Materials used for the trusses can include, for example, steel, aluminum, and/or polymer composites, including Kevlar or laminates of both metallic and polymer materials, as well as glass filled polymers. Other materials or combinations thereof may also be used, as may be applicable or desirable. Furthermore, various truss system components can be heat treated or otherwise specially annealed, such that improved spring and resilience characteristics can be realized, thus providing additional strength and flexibility without adding undue weight to the overall vehicle.

Figure 7C:
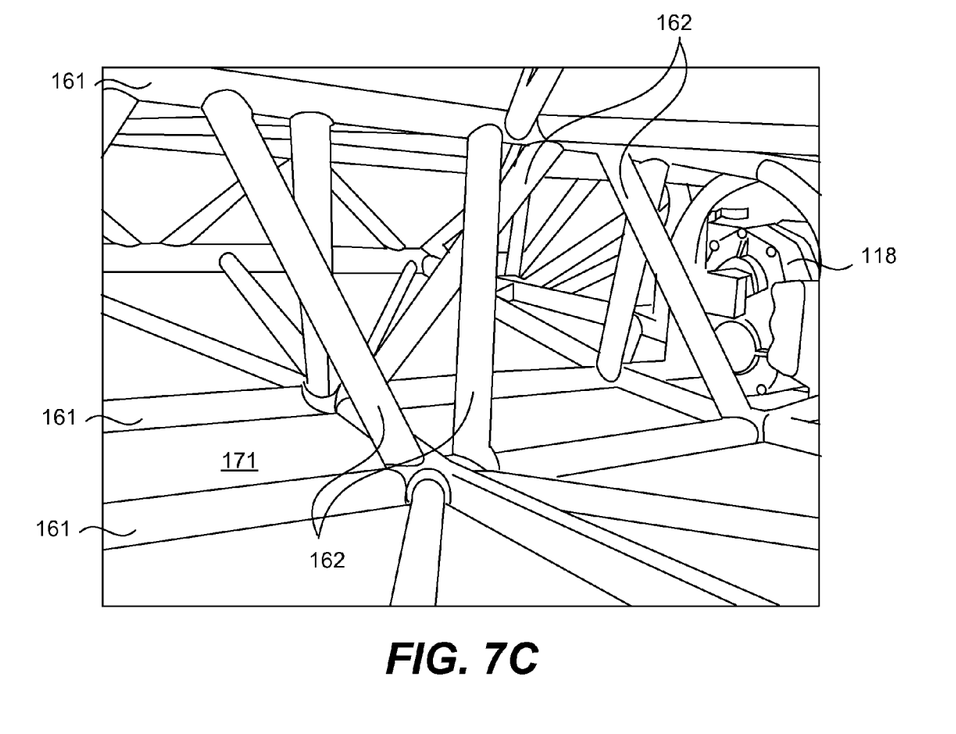
FIG. 7C illustrates in front corner elevated view the rear end of the internal triangular truss system of FIG. 7B and an adjacent motor installed within the modular vehicle of FIG. 2 according to one embodiment of the present invention.

Continuing with FIG. 7C, the rear end of the internal triangular truss system of FIG. 7B and an adjacent motor installed within the modular vehicle are shown in front corner elevated view. Again, the triangular truss can run along the underside of the vehicle, and can have three primary tubes 161. A plurality of secondary tubes 162 can be welded at both ends to different primary tubes 161 so as to couple and space apart the primary tubes a set distance. A special arrangement can be used to accommodate motor 118, which is also located along the underside of the overall vehicle.

Figure 7D:
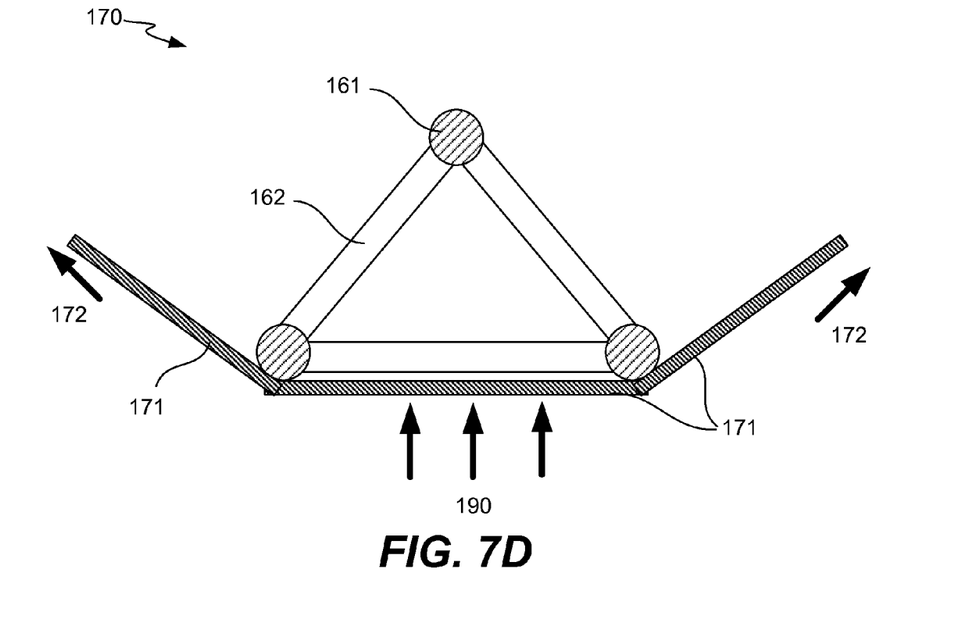
FIG. 7D illustrates in front cross-sectional view an exemplary vehicular support system having a triangular truss and protective diaphragms according to one embodiment of the present invention.

FIG. 7D illustrates in front cross-sectional view an exemplary vehicular support system having a triangular truss and protective diaphragms according to one embodiment of the present invention. Triangular truss and protective diaphragm system 170 can include a plurality of primary tubes or bars 161 that are connected by a plurality of secondary tubes or bars 162. One or more diaphragms 171 can be attached to this truss structure along its underside and also directed outward and upward away from the low point of the structure.

Such an arrangement can be designed to absorb, deflect and/or divert an explosion, blast or other concentrated outside force 190 that can come from, for example, the ground beneath the vehicle or thereabouts. As outside force 190 is incumbent upon the bottom portion of one or more diaphragms 171, the overall design of the diaphragms and triangular truss components 161, 162 results in the diaphragms being directed upward and outward in direction 172 away from the center truss structure and the vehicle in general. In addition to such diaphragms 171 that are located and design to divert explosions and other concentrated outside forces in such a manner, one or more armor plates (not shown) or other protective components can be coupled to the outside of the vehicle, such as at the diaphragms. This particular design of triangular truss and diaphragms serves to provide added protection to any passengers and/or cargo in the modular vehicle, such as when the vehicle might travel across hostile terrain, for example.

Although the foregoing invention has been described in detail by way of illustration and example for purposes of clarity and understanding, it will be recognized that the above described invention may be embodied in numerous other specific variations and embodiments without departing from the spirit or essential characteristics of the invention. For example, although many references have been made with respect to the modular component being a weapons or other military type component, many other types of modular components may be used. For example, a cargo transport, crowd control, mobile kitchen, mobile tanker or other type of modular component may also be used. Other changes and modifications may be practiced, and it is understood that the invention is not to be limited by the foregoing details, but rather is to be defined by the scope of the appended claims.

What is claimed is:

1. A modular motorized vehicle, comprising:
   a base body having a frame, a driver compartment, a chassis, a motor adapted to propel the vehicle, and a cavity region adapted to accommodate a removable modular component;
   a plurality of wheels coupled to said base body and adapted to facilitate the movement of said vehicle over a ground surface, wherein at least one of said plurality of wheels is adapted to be driven by said motor;
   a first removable modular component adapted to be locked and unlocked from said cavity region of said base body, wherein said first removable modular component provides added structural rigidity to the frame when installed within the base body, and wherein said first removable modular component comprises at least 20 percent of the overall volume and at least 20 percent of the overall weight of the entire modular motorized vehicle;
   one or more locking mechanisms that fasten said first removable modular component within said base body and that permit said first removable modular component to be removed and replaced with a second removable modular component when said one or more locking mechanisms are unlocked; and
   a vehicular support system having
      a primary tube arrangement having a plurality of primary tubes arranged in a triangular pattern, wherein said plurality of primary tubes is adapted to run along at least one dimension of the modular motorized vehicle,
      a plurality of secondary tubes arranged in triangular patterns between said primary tubes, wherein at least some of said secondary tubes are coupled to two or more of said primary tubes and are arranged at an angle with respect to at least one of said two or more coupled primary tubes,
      one or more diaphragms coupled to said primary tube arrangement and adapted to deflect outward in response to a concentrated outside force incumbent thereupon, and
      one or more bulkhead fittings located at one or more distal ends of said primary tubes, wherein said one or more bulkhead fittings are adapted to couple the vehicular support system to a frame or chassis of the modular motorized vehicle, and wherein said one or more bulkhead fittings are adapted to absorb stress in response to said concentrated outside force.

2. The modular motorized vehicle of claim 1, wherein the nature of said first removable modular component substantially defines the general overall function of the modular motorized vehicle when said first removable modular component is installed therein.

3. The modular motorized vehicle of claim 2, wherein the nature of said second removable modular component substantially defines the general overall function of the modular motorized vehicle when said second removable modular component is installed therein, and wherein the nature of said second removable modular component is substantially different than the nature of said first removable modular component.

4. The modular motorized vehicle of claim 2, wherein the nature of said first removable modular component is selected from the group consisting of: military, drug running, medivac, firefighting, biochemical threat control, search and rescue, hunting, reconnaissance, command center, outback vehicle, survival camper, strike vehicle, border patrol, personnel transport and crowd control.

5. The modular motorized vehicle of claim 1, wherein said first removable modular component comprises about half of the overall volume and about half of the overall weight of the entire modular motorized vehicle.

6. The modular motorized vehicle of claim 1, wherein said one or more locking mechanisms include a central locking unit located at the center of a floor at said cavity region.

7. The modular motorized vehicle of claim 6, wherein said one or more locking mechanisms further include a plurality of locking mechanisms distributed at locations along each edge where the first removable modular component meets the base body.

8. A modular vehicle, comprising:
   a base body having a frame, a motor adapted to propel the vehicle, and a cavity region adapted to accommodate a removable modular component therewithin;
   a first removable modular component adapted to be locked and unlocked from said cavity region of the base body, wherein said first removable modular component provides substantial added structural rigidity to the frame when installed within the base body;
   one or more locking mechanisms that fasten said first removable modular component to said base body and that permit said first removable modular component to be removed and replaced with a second removable modular component when said one or more locking mechanisms are unlocked; and
   a triangular truss system having
     a plurality of primary tubes arranged in a triangular pattern and configured to run along at least one dimension of the modular vehicle,
     a plurality of secondary tubes coupled to and arranged at an angle with respect to said primary tubes, and
     one or more diaphragms coupled to said primary tubes and adapted to deflect outward in response to a concentrated outside force.

9. The modular vehicle of claim 8, wherein the nature of said first removable modular component substantially defines the general overall function of the modular vehicle when said first removable modular component is installed therein.

10. The modular vehicle of claim 9, wherein said first removable modular component is replaceable with any of a second through sixth distinctive removable modular components, and wherein the nature of each of said second through sixth removable modular components substantially defines the general overall function of the modular vehicle when said respective removable modular component is installed therein, and wherein the nature of each of said second through sixth removable modular components is substantially different than the nature of each of the other removable modular components.

11. The modular vehicle of claim 8, wherein said first removable modular component comprises at least 20 percent of the overall volume and at least 20 percent of the overall weight of the entire modular vehicle.

12. The modular vehicle of claim 8, wherein said one or more locking mechanisms include a central locking unit located at the center of a floor at said cavity region and a plurality of locking mechanisms distributed at locations along each edge where the first removable modular component meets the base body.

13. The modular vehicle of claim 8, further comprising:
   one or more bulkhead fittings located at one or more distal ends of said primary tubes, wherein said one or more bulkhead fittings are adapted to couple the triangular truss system to the frame of said vehicle, and wherein said one or more bulkhead fittings are adapted to absorb stress in response to said concentrated outside force.

14. The modular vehicle of claim 13, wherein said vehicle is a motorized ground-based vehicle having three or more wheels.

15. The modular vehicle of claim 13, wherein one or more of said plurality of secondary tubes is arranged at about a 45 degree angle with respect to each of said coupled primary tubes.

16. The modular vehicle of claim 13, wherein said primary tube arrangement comprises exactly three primary tubes that are arranged to be in parallel with each other.

17. The modular vehicle of claim 13, wherein said triangular truss system is arranged to run along an underside of said associated vehicle.

18. The modular vehicle of claim 13, wherein said plurality of primary tubes and said plurality of secondary tubes are formed from a metallic alloy.

19. A modular vehicle, comprising:
   a base body having a frame, a motor adapted to propel the vehicle, and a cavity region adapted to accommodate a removable modular component therewithin;
   a first removable modular component adapted to be locked and unlocked from said cavity region of the base body, wherein said first removable modular component provides substantial added structural rigidity to the frame when installed within the base body;
   one or more locking mechanisms that fasten said first removable modular component to said base body and that permit said first removable modular component to be removed and replaced with a second removable modular component when said one or more locking mechanisms are unlocked; and
   a vehicular support system having a plurality of tubes arranged in a pattern and configured to run along at least one dimension of the modular vehicle, and one or more diaphragms coupled to said plurality of tubes and adapted to deflect outward in response to a concentrated outside force.

20. The modular vehicle of claim 19, further comprising:
   one or more bulkhead fittings located at one or more distal ends of said plurality of tubes, wherein said one or more bulkhead fittings are adapted to couple the vehicular support system to the frame of said vehicle, and wherein said one or more bulkhead fittings are adapted to absorb stress in response to said concentrated outside force.

* * * * *